US012619639B2

(12) United States Patent
Kierzyk

(10) Patent No.: US 12,619,639 B2
(45) Date of Patent: May 5, 2026

(54) SYSTEMS AND METHODS FOR IMPLEMENTING PERMISSION BYPASS FOR LARGE LANGUAGE MODELS

(71) Applicant: BOOST SUBSCRIBERCO L.L.C., Englewood, CO (US)

(72) Inventor: Kyle Robert Kierzyk, Wheaton, IL (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 258 days.

(21) Appl. No.: 18/534,381

(22) Filed: Dec. 8, 2023

(65) Prior Publication Data

US 2025/0190456 A1      Jun. 12, 2025

(51) Int. Cl.
| | |
|---|---|
| *G06F 16/3329* | (2025.01) |
| *G06F 16/334* | (2025.01) |
| *G06F 16/383* | (2019.01) |
| *G06F 40/00* | (2020.01) |
| *G06F 40/10* | (2020.01) |
| *G06F 40/279* | (2020.01) |
| *G06F 40/30* | (2020.01) |
| *G06N 20/20* | (2019.01) |

(52) U.S. Cl.
CPC ...... *G06F 16/3329* (2019.01); *G06F 16/3347* (2019.01); *G06F 16/383* (2019.01); *G06F 40/00* (2020.01); *G06F 40/10* (2020.01);

*G06F 40/279* (2020.01); *G06F 40/30* (2020.01); *G06N 20/20* (2019.01)

(58) Field of Classification Search
CPC ............. G06F 16/3329; G06F 16/3347; G06F 16/383; G06F 40/00; G06F 40/10; G06F 40/279; G06F 40/30; G06N 20/20
See application file for complete search history.

(56) References Cited

U.S. PATENT DOCUMENTS

| | | | | |
|---|---|---|---|---|
| 12,020,140 | B1 * | 6/2024 | Mondlock | ............ G06N 3/0455 |
| 2020/0184012 | A1 * | 6/2020 | Stoyanovsky | .......... G06F 40/56 |
| 2024/0169088 | A1 * | 5/2024 | Neelappa | ............ G06F 21/6227 |
| 2024/0354436 | A1 * | 10/2024 | Mukherjee | .......... G06F 16/3344 |

* cited by examiner

*Primary Examiner* — Linda Wong
(74) *Attorney, Agent, or Firm* — Quarles & Brady, LLP

(57) ABSTRACT

Systems and methods are provided for implementing permission bypass for LLM applications. One system includes an electronic processor that may be configured to receive, from a user device of a user, a user query pertaining to a topic. The electronic processor may also be configured to determine, responsive to a semantic search of a vector database, a plurality of electronic files related to the topic of the user query. The electronic processor may also be configured to determine, based on a permission level of the user, a first portion of the plurality of electronic files, where the first portion of the plurality of electronic files are accessible to the user under the permission level. The electronic processor may also be configured to generate, using a LLM, a response to the user query based on the first portion of the plurality of electronic files.

17 Claims, 7 Drawing Sheets

300

305 RECEIVING A USER QUERY

310 DETERMINING ELECTRONIC CONTENT RELATED TO THE USER QUERY

315 DETERMINING AN ACCESSIBILITY OF THE ELECTRONIC CONTENT FOR A USER

320 GENERATING, BASED ON THE ACCESSIBILITY, A RESPONSE TO THE USER QUERY

100

300

305

RECEIVING A USER QUERY

310

DETERMINING ELECTRONIC CONTENT RELATED TO THE USER QUERY

315

DETERMINING AN ACCESSIBILITY OF THE ELECTRONIC CONTENT FOR A USER

320

GENERATING, BASED ON THE ACCESSIBILITY, A RESPONSE TO THE USER QUERY

400

405

DETERMINING THAT THE ELECTRONIC
CONTENT IS ACCESSIBLE TO USER
UNDER A PERMISSION LEVEL

410

EXECUTING A LLM QUERY USING THE
ELECTRONIC CONTENT

415

GENERATING A RESPONSE TO THE
USER QUERY BASED ON THE LLM
QUERY

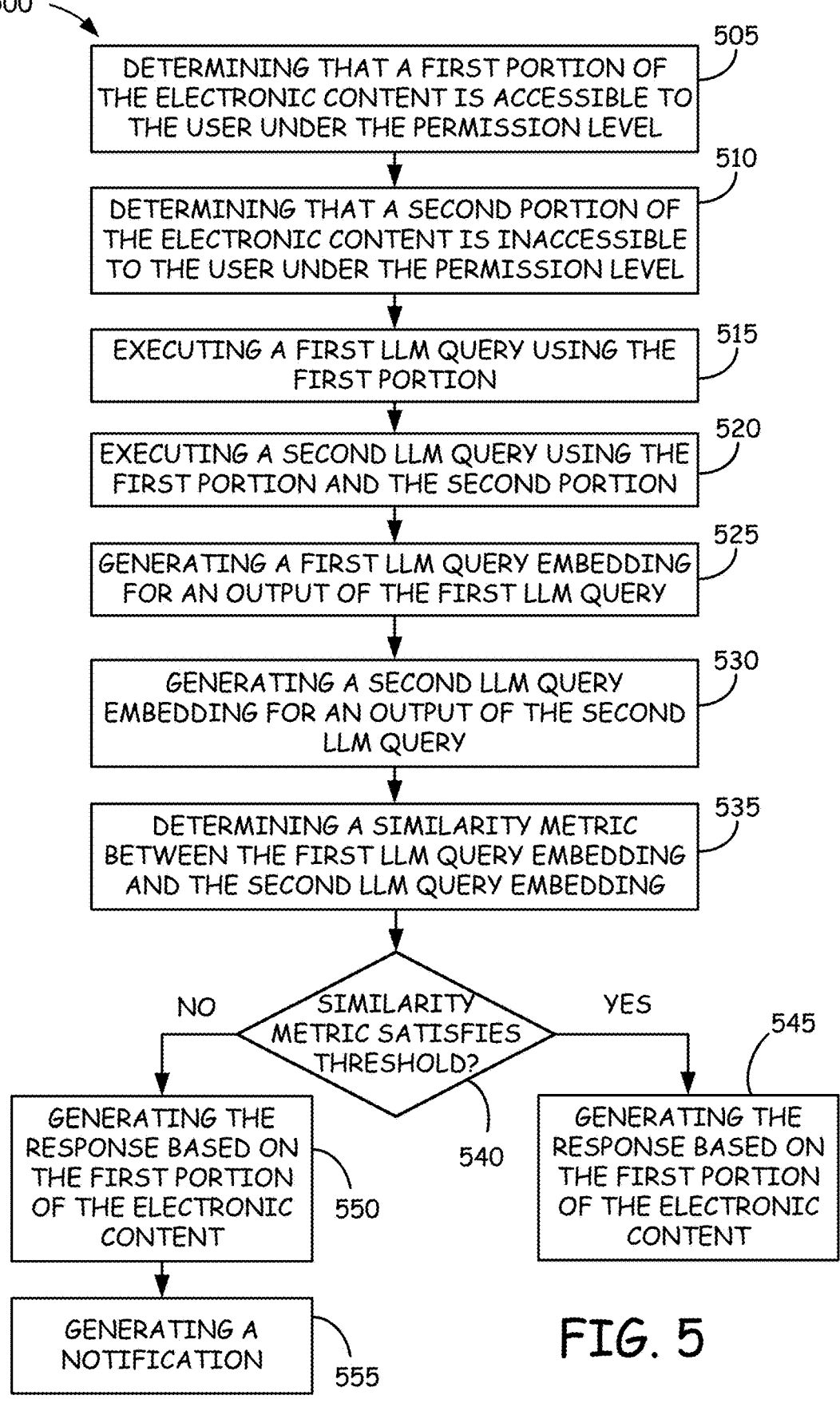

500

505 DETERMINING THAT A FIRST PORTION OF THE ELECTRONIC CONTENT IS ACCESSIBLE TO THE USER UNDER THE PERMISSION LEVEL

510 DETERMINING THAT A SECOND PORTION OF THE ELECTRONIC CONTENT IS INACCESSIBLE TO THE USER UNDER THE PERMISSION LEVEL

515 EXECUTING A FIRST LLM QUERY USING THE FIRST PORTION

520 EXECUTING A SECOND LLM QUERY USING THE FIRST PORTION AND THE SECOND PORTION

525 GENERATING A FIRST LLM QUERY EMBEDDING FOR AN OUTPUT OF THE FIRST LLM QUERY

530 GENERATING A SECOND LLM QUERY EMBEDDING FOR AN OUTPUT OF THE SECOND LLM QUERY

535 DETERMINING A SIMILARITY METRIC BETWEEN THE FIRST LLM QUERY EMBEDDING AND THE SECOND LLM QUERY EMBEDDING

540 SIMILARITY METRIC SATISFIES THRESHOLD?

NO

YES

550 GENERATING THE RESPONSE BASED ON THE FIRST PORTION OF THE ELECTRONIC CONTENT

545 GENERATING THE RESPONSE BASED ON THE FIRST PORTION OF THE ELECTRONIC CONTENT

555 GENERATING A NOTIFICATION

605
DETERMINING THAT A FIRST PORTION OF THE ELECTRONIC CONTENT IS ACCESSIBLE TO THE USER UNDER THE PERMISSION LEVEL

610
DETERMINING THAT A SECOND PORTION OF THE ELECTRONIC CONTENT IS INACCESSIBLE TO THE USER UNDER THE PERMISSION LEVEL

615
EXECUTING A FIRST LLM QUERY USING THE FIRST PORTION

620
EXECUTING A SECOND LLM QUERY USING THE FIRST PORTION AND THE SECOND PORTION

625
DETERMINING A SIMILARITY METRIC BETWEEN OUTPUTS OF THE FIRST LLM QUERY AND THE SECOND LLM QUERY

SIMILARITY METRIC SATISFIES THRESHOLD?
630

NO

YES

640
GENERATING THE RESPONSE BASED ON THE OUTPUT OF THE FIRST LLM QUERY

635
GENERATING THE RESPONSE BASED ON THE OUTPUT OF THE FIRST LLM QUERY

645
GENERATING A NOTIFICATION

FIG. 6

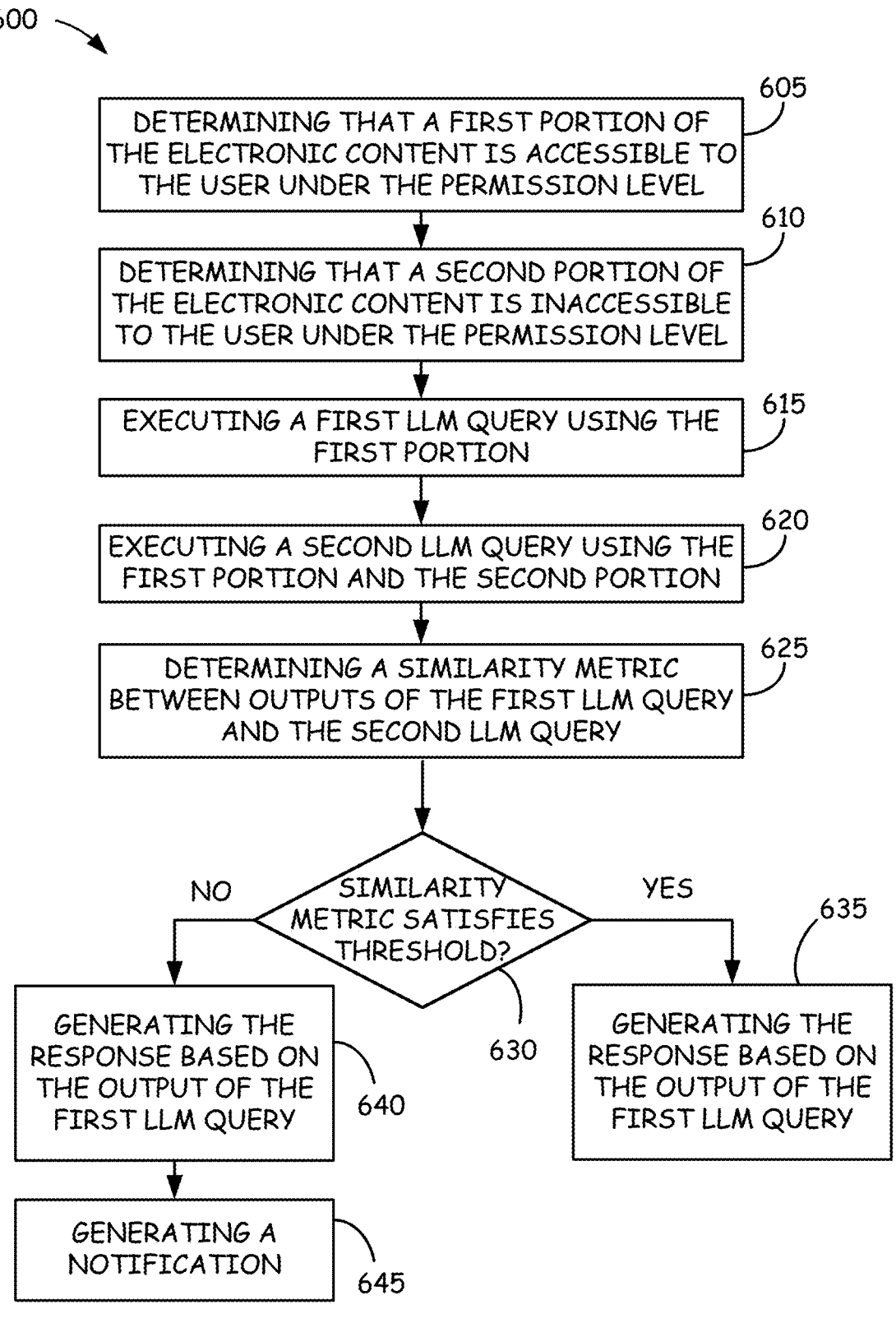

SYSTEMS AND METHODS FOR IMPLEMENTING PERMISSION BYPASS FOR LARGE LANGUAGE MODELS

BACKGROUND

This disclosure relates to large language model ("LLM") applications. LLMs have the ability understand and process text. LLMs generally perform a variety of natural language processing ("NLP") related tasks to produce content based on input prompts in human language.

The discussion above is merely provided for general background information and is not intended to be used as an aid in determining the scope of the claimed subject matter.

SUMMARY

This disclosure is in the field of LLM applications, and more particularly, in the field of implementing permission bypass in LLM applications.

LLMs have an ability to understand and process text. In some instances, a user can have an LLM help with a problem that contains proprietary information, such as through use of context learning. In some configurations, a vector database may be implemented. A vector database may store processed embeddings of the text (also referred to as vector embeddings). The vector database may store information in a manner such that related data is closer together. When the vector database is queried, the vector database may respond by identifying data that is most similar or useful to the query and providing that data to the LLM. This allows for automated retrieval of context or information for the LLM. Some systems can be implemented such that users can only access information said users have permission to access. Such restricted access can protect sensitive information from being accessed by a user via the LLM. However, by restricting the accessibility of information, the system may fail to identify an insight.

Accordingly, the technology disclosed herein may provide a solution to such technical problems. One configuration may provide a system. The system may include one or more electronic processors. The one or more electronic processors may be configured to receive, from a user device of a user, a user query pertaining to a topic. The one or more electronic processors may be configured to determine, responsive to a semantic search of a vector database, a plurality of electronic files related to the topic of the user query. The one or more electronic processors may be configured to determine, based on a permission level of the user, an accessibility of a first portion of the plurality of electronic files, where the first portion of the plurality of electronic files are accessible to the user under the permission level. The one or more electronic processors may be configured to generate, using a large language model ("LLM"), a response to the user query based on the first portion of the plurality of electronic files.

Another configuration may provide a method. The method may include receiving, with one or more electronic processors, a user query from a user device of a user, the user query being related to a topic. The method may include executing, with the one or more electronic processors, a search of a vector database based on the user query. The method may include determining, with the one or more electronic processors, based on the search, electronic content related to the topic of the user query. The method may include determining, with the one or more electronic processors, based on a permission level, an accessibility of the electronic content to the user. The method may include, when the electronic content is accessible to the user under the permission level, executing, with the one or more electronic processors, using a large language model "(LLM"), a first LLM query using the electronic content; and generating, with the one or more electronic processors, a first response to the user query based on a first result of the first LLM query.

Yet another configuration may provide a non-transitory, computer-readable medium storing instructions that, when executed by an electronic processor, perform a set of functions. The set of functions may include receiving, from a user device of a user, a user query. The set of functions may include generating, using an embedding model, a user query embedding for the user query. The set of functions may include executing a semantic search of a vector database to identify, based on the user query embedding, a plurality of vector embeddings from the vector database. The set of functions may include determining, based on the plurality of vector embeddings, a plurality of electronic files related to the user query. The set of functions may include determining, based on a permission level, an accessibility of the plurality of electronic files for the user. The set of functions may include generate, using a large language model ("LLM"), a response to the user query based on the accessibility of the plurality of electronic files.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

FIG. 5 is a flowchart illustrating a method of implementing permission bypass based on a similarity of LLM query embeddings when at least a portion of the electronic content is inaccessible to a user under a user permission according to some configurations.

FIG. 6 is a flowchart illustrating a method of implementing permission bypass based on a similarity of LLM query responses when at least a portion of the electronic content is inaccessible to a user under a user permission according to some configurations.

DETAILED DESCRIPTION OF THE PRESENT DISCLOSURE

Figure 1:
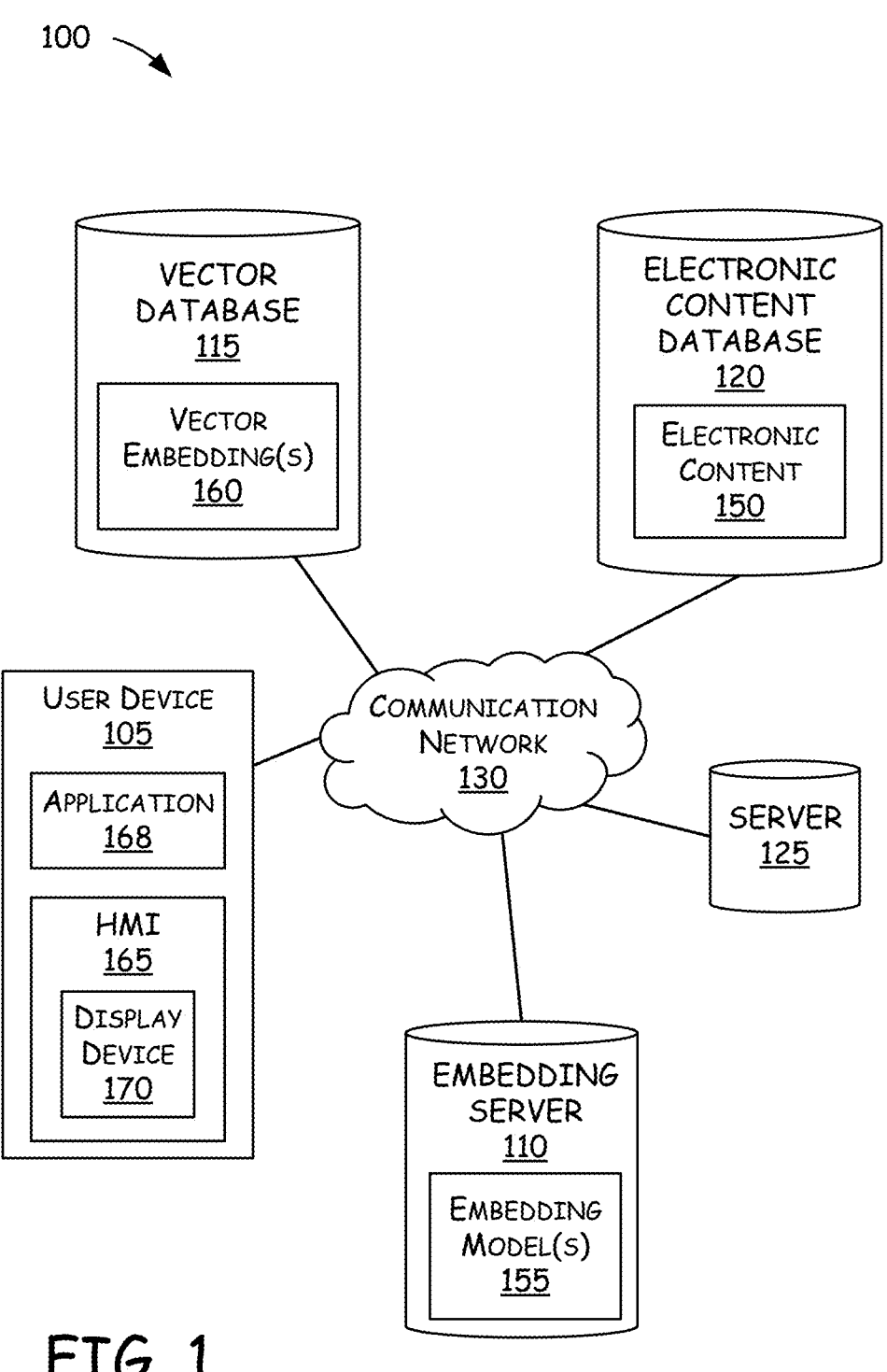
FIG. 1 schematically illustrates a system for implementing a permission bypass according to some configurations.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

As noted herein, this disclosure is in the field of LLM applications, and more particularly, in the field of implementing permission bypass in LLM applications.

LLMs have an ability to understand and process text. In some instances, a user can have an LLM help with a problem that contains proprietary information, such as through use of context learning. In some configurations, a vector database may be implemented. A vector database may store processed embeddings of the text (also referred to as vector embeddings). The vector database may store information in a manner such that related data is closer together. When the vector database is queried, the vector database may respond by identifying data that is most similar or useful to the query and providing that data to the LLM. This allows for automated retrieval of context or information for the LLM. Some systems can be implemented such that users can only access information said users have permission to access. Such restricted access can protect sensitive information from being accessed by a user via the LLM. However, by restricting the accessibility of information, the system may fail to identify an insight.

In some configurations, when a query is received, the technology disclosed herein may execute the query on a vector database twice: once with the user permission(s) and once with full permissions. The vector database may return a distance between both sets of documents and the queries. The technology disclosed herein may then compare the difference in distances between the retrieved documents and the query for both cases. In some configurations, when the full permission and user permissions return documents that are similar enough within a set tolerance, then the technology disclosed herein may disengage the permission bypass and execute the LLM query as normal (e.g., without bypassing a user permission). In some configurations, when the difference in documents is sufficiently large the technology disclosed herein may run the LLM mode twice, once with both sets of documents and once with the documents that the user has access to under the user permission. In some instances, the technology disclosed herein may alert a user that the user is blocked from potentially useful documents or may provide instructions on how to be provided access to the potentially useful documents. The technology disclosed herein may return the answer to the question based on the user permissions. In some configurations, the technology disclosed herein may consider network traffic. For instance, the technology disclosed herein may determine when to run the full permission version based on network traffic to the LLM.

Once both versions have been run, the technology disclosed herein may enter an analysis stage. Both versions of the answer to the query may be run through an embedding model that the vector database uses and the distance, L2, cosine, or similar metric may be measured between them. When the distance meets a set threshold that reveals that the answer changed significantly based on the different permission level, then the technology disclosed herein may save the full permission and begin to act. In some configurations, the technology disclosed herein may alert the user that the permission level caused a meaningful change in response. In some configurations, the technology disclosed herein can notify (e.g., send the conversation chain to) a relevant party, such as a user having permission. Accordingly, the technology disclosed herein allows for otherwise restricted institutional knowledge to still be made useful while maintaining any desired or necessary confidentiality.

In some configurations, the technology disclosed herein may be more sensitive to certain keywords, employees, phrases, or areas of inquiry than others. In some instances, either manually or through a reinforcement mechanism where the technology disclosed herein may return a bypassed query, the user or supervisor with permissions rates whether or not the bypass was useful. In some configurations, when a grouping of LLM models with different training sets or permission structures are used, the technology disclosed herein can also run a bypass with respect to the LLM models permissions as well as or in place of the vector database permissions.

FIG. 1 illustrates a system 100 for implementing a vector database permission bypass according to some configurations. In the illustrated example, the system 100 includes a user device 105, an embedding server 110, a vector database 115, an electronic content database 120, and a server 125. In some configurations, the system 100 includes fewer, additional, or different components than illustrated in FIG. 1 in different configurations. As one example, the system 100 may include multiple user devices 105, multiple embedding servers 110, multiple vector databases 115, multiple electronic content databases 120, multiple servers 125, or a combination thereof. As another example, one or more components of the system 100 may be combined into a single device. For instance, in some examples, the vector database 115, the electronic content database 120, the embedding server 110, or a combination thereof may be combined into the server 125 such that the server 125 may perform the functionality described herein as being performed by the vector database 115, the electronic content database 120, the embedding server 110, or a combination thereof. In some examples, the embedding server 110, the vector database 115, and the electronic content database 120 may be referred to as a vector database permission bypass system.

The user device 105, the embedding server 110, the vector database 115, the electronic content database 120, and the server 125 may communicate over one or more wired or wireless communication networks 130. Portions of the communication networks 130 may be implemented using a wide area network ("WAN"), such as the Internet, a local area network ("LAN"), such as a Bluetooth™ network or Wi-Fi, and combinations or derivatives thereof. Alternatively, or in addition, in some configurations, components of the system 100 communicate directly as compared to through the communication network 130. Also, in some configurations, the components of the system 100 may communicate through one or more intermediary devices not illustrated in FIG. 1.

Figure 2:
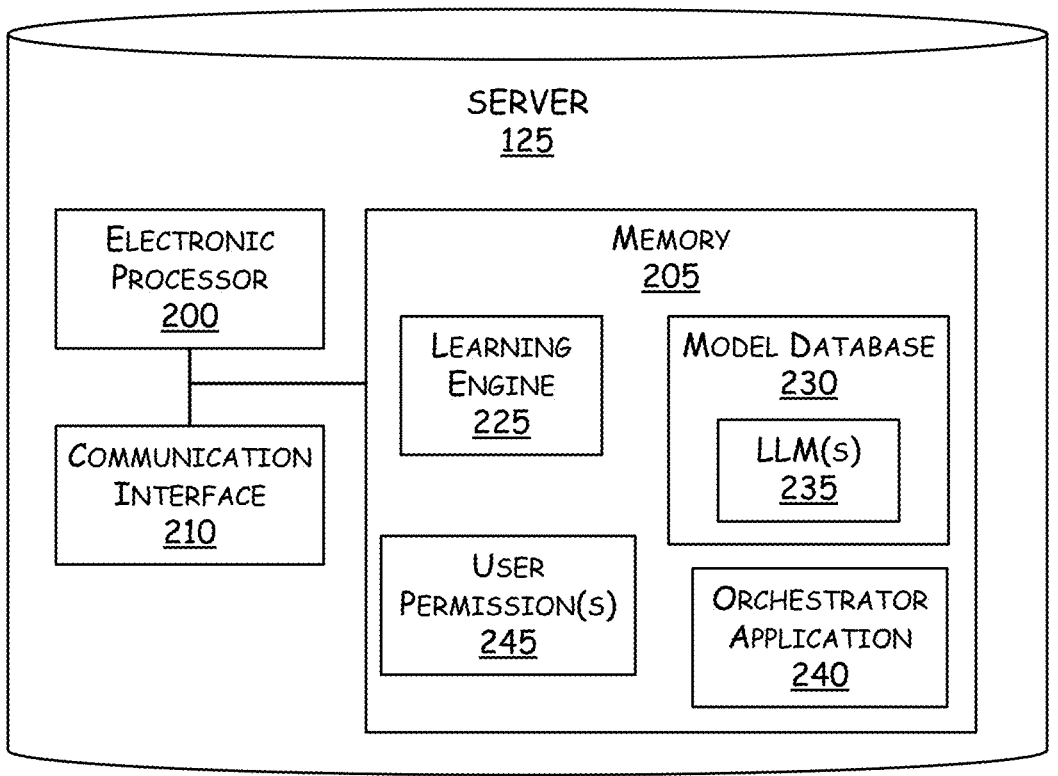
FIG. 2 schematically illustrates a server included in the system of FIG. 1 in accordance with some configurations.

The server 125 may be a computing device. FIG. 2 schematically illustrates an example server 125 according to some configurations. As illustrated in FIG. 2, the server 125 includes an electronic processor 200, a memory 205, and a communication interface 210. The electronic processor 200, the memory 205, and the communication interface 210 may communicate wirelessly, over one or more communication lines or buses, or a combination thereof. The server 125 may include additional, different, or fewer components than those illustrated in FIG. 2 in various configurations. The server 125 may perform additional or different functionality than the functionality described herein. Also, the functionality (or a portion thereof) described herein as being performed by the server 125 may be performed by another component (e.g., the user device 105, another component of the system 100, or a combination thereof), distributed among multiple devices (e.g., as part of a cloud service or cloud-computing environment), combined with another component (e.g., the user device 105, another component of the system 100, or a combination thereof), or a combination thereof.

The communication interface 210 may include a transceiver that communicates with the embedding server 110, the vector database 115, the electronic content database 120, the server 125, or a combination thereof over the communication network 130 and, optionally, one or more other communication networks or connections. The electronic processor 200 includes one or more processors (e.g., one or more microprocessors, one or more application-specific integrated circuits ("ASICs"), and/or one or more other suitable electronic device for processing data), and the memory 205 includes a non-transitory, computer-readable storage medium. The electronic processor 200 is configured to retrieve instructions and data from the memory 205 and execute the instructions.

As illustrated in FIG. 2, the memory 205 may store a learning engine 225 and a model database 230. In some configurations, the learning engine 225 develops one or more models using one or more machine learning functions. Machine learning functions are generally functions that allow a computer application to learn without being explicitly programmed. In particular, the learning engine 225 is configured to develop an algorithm or model based on training data. As one example, to perform supervised learning, the training data includes example inputs and corresponding desired (for example, actual) outputs, and the learning engine 225 progressively develops a model that maps inputs to the outputs included in the training data. As another example, to perform self-supervised learning ("SSL"), a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data). Machine learning performed by the learning engine 225 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 225 to ingest, parse, and understand data and progressively refine models.

Models generated by the learning engine 225 can be stored in the model database 230. As illustrated in FIG. 2, the model database 230 may be included in the memory 205 of the server 125. It should be understood, however, that, in some configurations, the model database 230 may be included in one or more separate devices accessible by the server 125 of FIG. 1 (including a remote database, and the like).

As described in greater detail herein, in some configurations, the technology disclosed herein may utilize or implement one or more LLMs as part of implementing a permission bypass, such as, e.g., with respect to the vector database 115. Accordingly, in some configurations, the learning engine 225 may develop one or more large language models ("LLMs") 235. Generally, a LLM 235 may include a deep artificial intelligence ("AI") or machine learning model (also referred to as language learning model) that can comprehend and generate human language text. For instance, a LLM 235 may be configured to determine meanings (or context) from a sequence of words and understand relationships between those words and, ultimately, perform a task based on that understanding. For instance, a LLM 235 may perform a variety of natural language processing ("NLP") related tasks to produce content based on input prompts in human language. Such tasks may include answering questions (e.g., responding to a user query), translating text, text generation, content summary, sentiment analysis, etc.

The LLM(s) 235 may be an artificial neural network that is trained using self-supervised learning, semi-supervised learning, or a combination thereof. Accordingly, in some configurations, the learning engine 225 may develop artificial neural networks using self-supervised learning, semi-supervised learning, or a combination thereof. In such configurations, the training data used by the learning engine 225 may be a large corpus of data (e.g., electronic content stored in the electronic content database 120). For example, the training data used to train the LLM(s) 235 may include billions of parameters (e.g., over 170 billion parameters). As illustrated in FIG. 2, the LLM(s) 235 may be stored in the model database 230 of the server 125. It should be understood, however, that, in some configurations, the LLM(s) 235 may be included in one or more separate devices accessible by the server 125 of FIG. 1 (including a remote database, and the like). In some configurations, the LLM(s) 235 may be trained (or retrained) using feedback data (as training data). For instance, in some configurations, the electronic processor 200 may determine one or more similarity metrics, as described in greater detail herein. In some configurations, the similarity metrics may be implemented as training data (or feedback data), which may be utilized to retrain or update the LLM(s) 235 or other machine learning models described herein. Alternatively, or in addition, in some configurations, the machine learning models described herein (e.g., the LLM(s) 235, the embedding model(s) 155, etc.) may be trained such that weighting factors for one or more terms or concepts are implemented. For example, in some configurations, various terms may be weighted higher than other terms, such as, e.g., for implementing permission bypass.

As illustrated in FIG. 2, the memory 205 may include an orchestrator application 240 (e.g., a silent orchestrator, as described herein) (referred to herein as "the application 240"). The application 240 is a software application executable by the electronic processor 200 in the example illustrated and as specifically discussed below, although a similarly purposed module can be implemented in other ways in other examples. In some configurations, the application 240 may be a dedicated software application locally stored in the memory 205 of the server 125. As described in greater detail herein, the application 240 (when executed by the electronic processor 200) may enable or facilitate bypassing permissions (e.g., implementing a vector database permission bypass).

In some configurations, the memory 205 may include one or more user permissions 245. As used herein, a user permission 245 may define accessibility to content (e.g., electronic or digital content). In some examples, the user permission(s) 245 may specify what content a user may access or interact with (e.g., view, edit, download, etc.). In some configurations, the user permission(s) 245 may be based on a specific user (e.g., user-specific user permissions). For instance, a first user may have a first user permission while a second user may have a second user permission different from the first user permission. In some examples, the user permissions 245 may be based on a role or title of a user, a department or group of a user, etc. For example, a first user with a manager title may have different user permissions 245 than a second user with a corporate executive title. As another example, a first user belonging to an IT department may have different user permissions 245 than a second user belonging to an accounting department.

The memory 205 may include additional, different, or fewer components in different configurations. Alternatively, or in addition, in some configurations, one or more components of the memory 205 may be combined into a single component, distributed among multiple components, or the like. Alternatively, or in addition, in some configurations, one or more components of the memory 205 may be stored remotely from the server 125, or, in a remote database, another server, a remote user device, an external storage device, or the like (e.g., the vector database 115, the user device 105, the electronic content database 120, the embedding server 110, etc.).

Returning to FIG. 1, the system 100 may include the electronic content database 120. Although not illustrated in FIG. 1, the electronic content database 120 may include similar components as the server 125, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces.

As illustrated in FIG. 1, the electronic content database 120 may include electronic content 150. The electronic content 150 may include various media types or formats. For instance, the electronic content 150 may include videos, audios, images, documents, etc. As one example, the electronic content 150 may include electronic documents (also referred to herein as electronic files), including, e.g., a word processing file, a processing file, a spreadsheet file, a presentation file, an electronic correspondence (e.g., email, multimedia messages, etc.). As another example, the electronic content 150 may include audio files, including, e.g., an MP3 file, a WAV file, etc. As yet another example, the electronic content 150 may include video files, including, e.g., an MP4 file, a MOV file, etc. As yet another example, the electronic content 150 may include image files, including, e.g., a JPEG file, a TIFF file, a GIF, a PDF file, etc.

In some configurations, the electronic content 150 may originate as electronic or digital content (e.g., a work processing file). Alternatively, or in addition, in some configurations, the electronic content 150 may originate as non-electronic or non-digital content (e.g., a handwritten document) that is converted to electronic or digital content (e.g., a scanned copy of a handwritten document). In some configurations, the electronic content 150 may be associated with a particular domain (e.g., a company or organization, a topic or category, etc.). For example, the electronic content 150 may include electronic content 150 for an organization. Alternatively, or in addition, in some configurations, the electronic content 150 may be associated with various domains.

As described in greater detail herein, the electronic content 150 may be used as training data for the LLMs 235 (e.g., as labeled training data or unlabeled training data). Alternatively, or in addition, the electronic content 150 may be utilized by the LLMs 235 for responding to a user query or prompt, as described in greater detail herein.

The system 100 may also include the embedding server 110. The embedding server 110 may be configured to generate embeddings. As used herein, "embeddings" may refer to numerical representations of words, phrases, sentences, etc., where those numerical representations capture meaning and context of the words, phrases, sentences, etc. For instance, an embedding may represent text such that the text can be processed by machine learning algorithms (e.g., the LLMs 235). For instance, as illustrated in FIG. 1, the embedding server 110 may store one or more embedding models 155. The embedding model(s) 155 may generate one or more embeddings based on received input or content. As described in greater detail herein, in some configurations, the embedding model(s) 155 may receive a user query and generate a query embedding representing the user query. Alternatively, or in addition, in some configurations, the embedding model(s) 155 may receive electronic content (e.g., the electronic content 150) and generate one or more vector embeddings for the electronic content 150, as described in greater detail herein. Although not illustrated in FIG. 1, the embedding server 110 may include similar components as the server 125, such as one or more electronic processors (for example, one or more microprocessors, ASICs, and/or other suitable electronic devices), a memory (for example, a non-transitory, computer-readable storage medium), a communication interface, such as a transceiver, for communicating over the communication network 130 and, optionally, one or more additional communication networks or connections, and one or more human machine interfaces.

The system 100 may also include the vector database 115. The vector database 115 may store data (e.g., unstructured data, such as, e.g., text, images, audio, etc.) as vector embeddings 160. The vector embeddings 160 may be vector representations of associated electronic content (e.g., the electronic content 150). In some examples, the vector embeddings 160 may capture (or otherwise represent) semantic meaning or context of associated electronic content (e.g., the electronic content 150). In some configurations, the vector database 115 may be specific to an entity or organization (e.g., a specific company or user). As described in greater detail herein, in some configurations, the LLMs 235 may utilize one or more of the vector embeddings 160 as part of implementing or facilitate bypassing permissions (e.g., implementing a vector database permission bypass). Although not illustrated in FIG. 1, the vector database 115 may include similar components as the server 125, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces.

As illustrated in FIG. 1, the system 100 may also include the user device 105. The user device 105 may include a computing device, such as a desktop computer, a laptop computer, a tablet computer, a terminal, a smart telephone, a smart television, a smart wearable, or another suitable computing device that interfaces with a user. Although not illustrated in FIG. 1, the user device 105 may include similar components as the server 125, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces. In some configurations, the functionality (or a portion thereof) as described as being performed by the server 125 may be locally performed by the user device 105. Alternatively, or in addition, in some configurations, the user device 105 may perform additional or different functionality than described herein. As one example, in some configurations, the functionality (or a portion thereof) as being performed by the server 125 may be performed by another component of the system 100, such as, e.g., the user device 105. In such configurations, the user device 105 may store at least one of, e.g., the application 240, the learning engine 225, the model database 230, the LLMs 235, the user permissions 245, or the like.

As illustrated in FIG. 1, the user device 105 may include a human machine interface ("HMI") 165 for interacting with a user. The HMI 165 may include one or more input devices, one or more output devices, or a combination thereof. Accordingly, in some configurations, the HMI 165 allows a user to interact with (e.g., provide input to and receive output from) the user device 105. For example, the HMI 165 may include a keyboard, a cursor-control device (e.g., a mouse), a touch screen, a scroll ball, a mechanical button, a display device (e.g., a liquid crystal display ("LCD")), a printer, a speaker, a microphone, or a combination thereof.

In the illustrated example of FIG. 1, the HMI 165 includes a display device 168. The display device 168 may be included in the same housing as the user device 105 or may communicate with the user device 105 over one or more wired or wireless connections. As one example, the display device 168 may be a touchscreen included in a laptop computer, a tablet computer, or a smart telephone. As another example, the display device 168 may be a monitor, a television, or a projector coupled to a terminal, desktop computer, or the like via one or more cables.

As illustrated in FIG. 1, the user device 105 may include a user application 170. The user application 170 is a software application executable by an electronic processor in the example illustrated and as specifically discussed below, although a similarly purposed module can be implemented in other ways in other examples. In some configurations, the user application 170 may be a dedicated software application locally stored in a memory of the user device 105. In some configurations, the user application 170 (when executed by an electronic processor) may enable or facilitate user interaction with the LLM(s) 235. For instance, in some examples, the user application 170 may facilitate querying the LLM(s) 235 based on user input. As one example, a user may interact with the user application 170 (e.g., via a user interface provided to the user by the user application 170) by providing a user input, such as, e.g., a user query (also referred to as a prompt). In some examples, a user query may be a string input or message that articulates (or otherwise provides) a question or task request pertaining to a particular topic or context. As one example, a user query may be: "What wine pairs well with fish?". As another example, a user query may be: "Translate 'I love you' to French." As yet another example, a user query may be: "Write executable code that converts Celsius to Fahrenheit." As yet another example, in the context of a user being an employee of Company ABC, a user query may be: "What was Company ABC's average revenue over the past five years?". Alternatively, or in addition, in some configurations, the user query may be automatically generated or triggered (e.g., without the user manually providing a user input). For example, in some instances, the user query may be generated by an application or other software module, where the user did not directly provide the user query. As one example, the user query may be generated responsive to an indirect user interaction with the user device 105 (e.g., a user interaction may trigger the generation of the user query without the user directly requesting or generating the user query). As described in greater detail herein, the user device 105 (via the user application 170 being executed by an electronic processor) may output the user query and receive a response to that user query.

Figure 3:
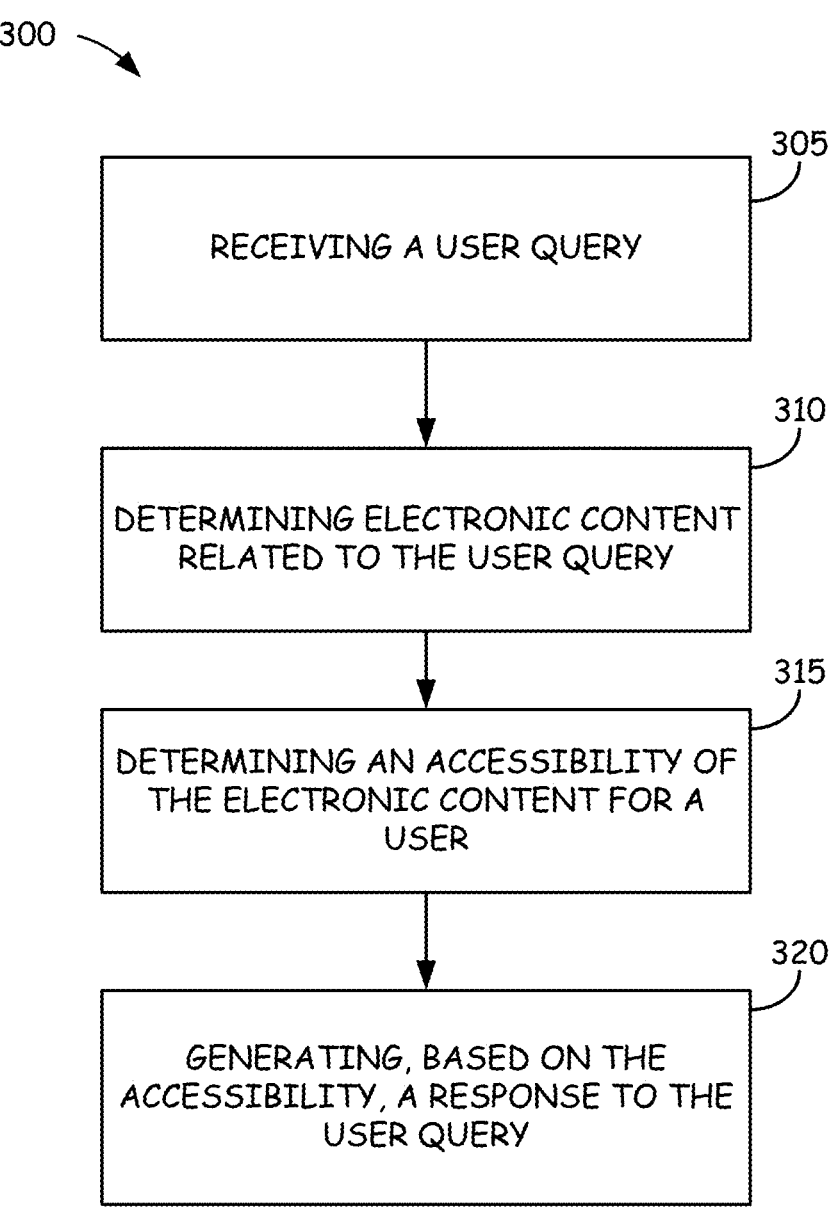
FIG. 3 is a flowchart of an example method for implementing permission bypass in according to some configurations.

FIG. 3 illustrates a flowchart of an example method 300 for implementing permission bypass in the context of LLM according to some configurations. The method 300 is described as being performed by the server 125 and, in particular, the application 240 as executed by the electronic processor 200. However, as noted above, the functionality described with respect to the method 300 may be performed by other devices, such as, e.g., the user device 105, or distributed among a plurality of devices, such as a plurality of servers included in a cloud service.

As illustrated in FIG. 3, the method 300 may include receiving, with the electronic processor 200, a user query (at block 305). In some configurations, the electronic processor 200 may receive the user query from the user device 105 (via the communication network 130) through the communication interface 210. As noted herein, the user query may be a query or task request pertaining to a particular topic or context.

The electronic processor 200 may determine electronic content related to the user query (at block 310). As noted herein, electronic content may include various forms or formats, including, e.g., electronic or digital files or documents. In some configurations, the electronic processor 200 may determine electronic content based on relevancy to a topic or context of the user query.

In some configurations, the electronic processor 200 may determine electronic content by interacting with the vector database 115 (e.g., the vector embedding(s) 160 included therein). The electronic content may be identified or selected based on a similarity (or relevancy) to the user query (e.g., a topic thereof). Accordingly, in some configurations, the electronic processor 200 may execute a search of the vector database 115 based on the user query. In some examples, the electronic processor 200 may execute (or trigger) a semantic search of the vector database 115 (e.g., the vector embedding(s) 160 included therein).

In such configurations, the electronic processor 200 may utilize a user query embedding of the user query. Accordingly, in some configurations, the electronic processor 200 may receive a user query embedding of the user query. For instance, in some examples, the user device 105 may transmit (or otherwise provide) the use query to the embedding server 110. Responsive to receiving the user query, the embedding server 110 may generate, using the embedding model(s) 155, a user query embedding of (or representing) the user query. For instance, the embedding server 110 may provide the user query to the embedding model(s) 155 (as an input of the embedding model(s) 155), execute the embedding model(s) 155, and generate a user query embedding of the user query (as an output of the embedding model(s) 155). The embedding server 110 may then transmit (or otherwise provide) the user query embedding to the server 125 (e.g., the electronic processor 200).

The electronic processor 200 may execute a search of the vector database 115 using the user query embedding of the user query. The search may be a semantic search of the vector database 115. The electronic processor 200 may determine the electronic content based on a similarity between the vector embedding(s) 160 and the user query embedding. For example, the electronic processor 200 may identify one or more vector embeddings 160 that satisfy a similarity threshold or condition with respect to the user query embedding (e.g., a similarity measure). The similarity threshold or condition may represent an acceptable similarity variation or difference range such that, when two or more embeddings are within the acceptable similarity variation range, the embeddings (and the data represented by those embeddings), can be considered similar or relevant. In some instances, the similarity threshold or condition may be represented by a predetermined or preset similarity measure between two or more embeddings. For example, the electronic processor 200 may determine that a vector embedding 160 is similar or relevant to the user query embedding when the vector embedding 160 and the user query embedding are within a similarity variation range (e.g., within a similar measure of each other). Following this example, the electronic processor 200 may determine that the electronic content represented by that vector embedding 160 is relevant or similar to the user query. Accordingly, in some configurations, the electronic processor 200 may determine electronic content (or a portion thereof) by matching (or determining similar measures between) the user query embedding to one or more of the vector embeddings 160 (e.g., as a set of relevant vector embeddings).

The electronic processor 200 may determine an accessibility of the electronic content for the user (at block 315). In some configurations, the electronic processor 200 may determine the accessibility of the electronic content based on a permission level (also referred to herein as a user permission or permissions) (e.g., the user permission(s) 245 of FIG.

2). In some instances, the permission level may be a full permission level. In such instances, under the full permission level, a user may have full or unlimited access to the electronic content relevant to the user query. Alternatively, in some instances, the permission level may be a partial permission level (or a low permission level). In such instances, under the partial permission level, a user may have partial or limited (less than full) access to the electronic content relevant to the user query. Accordingly, in some configurations, the electronic processor 200 may access the user permission(s) 245 from the memory 205 and utilize the user permission(s) 245 to determine the accessibility of the electronic content (or one or more portions thereof) for the user.

In some examples, when the user permission(s) 245 of the user with respect to the electronic content indicate a quantity of the electronic content above a threshold amount is inaccessible the electronic processor 200 may determine that the electronic content is inaccessible. The quantity and threshold may be values indicative of, for example, respective numbers of pieces of the electronic content (e.g., number of files, documents, etc.), respective sizes of data of the electronic content, or another form of measure. In some examples, the electronic content may be categorized into different portions corresponding to difference relevancy levels, for example, based on the search of the vector database 115 and similarity scores that may result. In such examples, the electronic processor 200 may have multiple thresholds (e.g., a threshold for each relevancy level, where the threshold values decrease as the relevancy level increases) and may determine that the electronic content is inaccessible based on the user permission(s) 245 when one or a certain number of the threshold values is exceeded. Accordingly, in some examples, the electronic processor 200 may determine that the electronic content is inaccessible if one or only a few highly relevant portions of the electronic content are not accessible to the user, and may determine that the electronic content is accessible even if several or many lower relevancy portions of the electronic content are not accessible.

As described herein, user accessibility (or user permissions) may adversely impact responding to a user query. For example, when the most relevant electronic content is inaccessible to a user due to user permissions, the response may ultimately be generated using less relevant electronic content. As such, a response to a user query may be adversely impacted when electronic content being most relevant to the user query is inaccessible due to user permissions. Accordingly, in some configurations, the technology disclosed herein may determine an accessibility (or inaccessibility) to relevant electronic content and, ultimately, determine an impact of the accessibility (or the user permissions causing the inaccessibility) on the response provided to the user query, as described in greater detail herein.

As illustrated in FIG. 3, the electronic processor 200 may generate, based on the accessibility, a response to the user query (at block 320). In some configurations, the electronic processor 200 may generate the response to the user query using the electronic content (or one or more portions thereof), based on accessibility of that electronic content (or one or more portions thereof), as described in greater detail herein. In some configurations, the electronic processor 200 may generate the response (e.g., at block 320) based on a LLM query. For instance, in some configurations, the electronic processor 200 may run (or execute) a LLM query for the user query using the electronic content (or a portion thereof). The electronic processor 200 may run (or execute)

the LLM query using the LLM(s) 235. For example, the electronic processor 200 may provide the user query (or corresponding user query embedding(s) thereof), the electronic content (or corresponding vector embedding(s) thereof), or a combination thereof to the LLM(s) 235 as input(s) and the LLM(s) 235 may provide or generate a response to the user query as an output.

Figure 4:
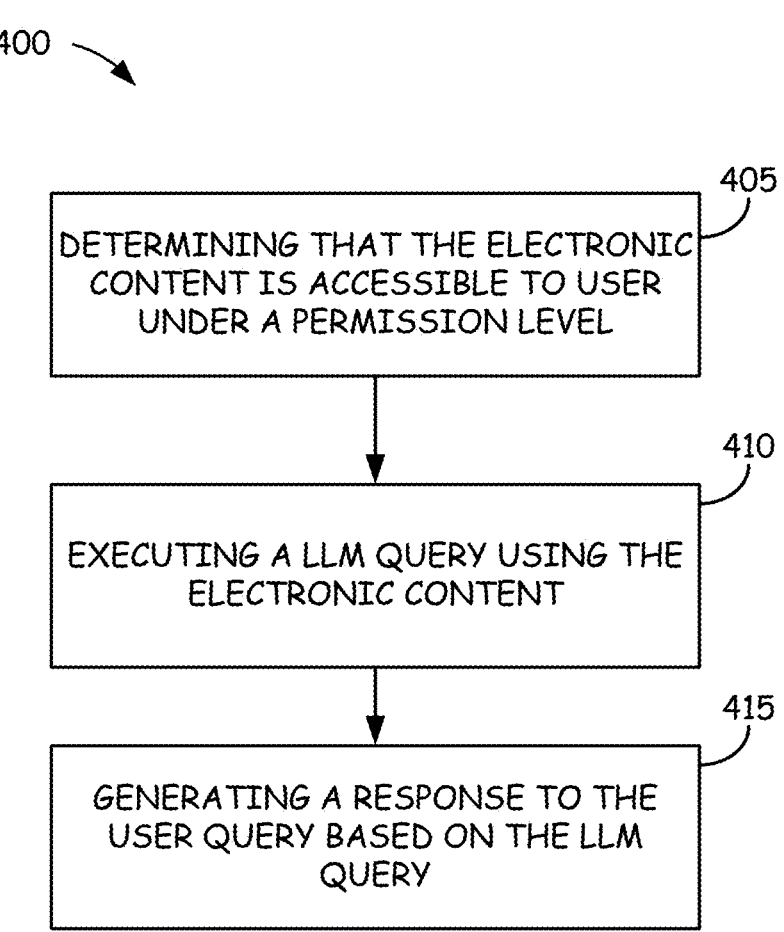
FIG. 4 is a flowchart illustrating a method of implementing permission bypass in when electronic content is accessible to a user under a user permission according to some configurations.

FIGS. 4-6 are flowcharts illustrating additional example methods of implementing permission bypass in the context of LLM according to some configurations. It should be understood that the steps illustrated in FIGS. 4-6 may be implemented in combination with or separate from the method 300 (or one or more steps thereof). For instance, in some implementations, the step(s) illustrated in FIG. 4 may be combined with the method 300 of FIG. 3. Alternatively, or in addition, the steps illustrated in FIGS. 3-6 may be implemented in various combinations or separately.

For example, FIG. 4 is a flowchart illustrating a method 400 of implementing permission bypass in the context of LLM when electronic content is accessible to a user under a user permission according to some configurations. For instance, the method 400 may be implemented when responding to a user query where the electronic content that is relevant (e.g., most-relevant) to the user query is also accessible to a user under the user permission(s) 245. In some configurations, the method 400 may be performed as part of the method 300 of FIG. 3, such as, e.g., as part of or in addition to block 315, block 320, or a combination thereof.

As illustrated in FIG. 4, the method 400 may include determining that the electronic content is accessible to the user under the user permission(s) 245 (at block 405). In some configurations, the electronic processor 200 may determine that the electronic content is accessible to the user under the user permission(s) 245 based on an accessibility (e.g., as determined at block 315 of FIG. 3). Accordingly, in some configurations, the electronic processor 200 may determine that the electronic content is accessible to the user under the user permission(s) 245 as similarly described herein with respect to method 300 (e.g., at block 315 of FIG. 3).

Responsive to determining that the electronic content is accessible to the user under the user permission(s) 245 (e.g., at block 405), the electronic processor 200 may execute an LLM query using the electronic content (at block 410). In some configurations, the electronic processor 200 execute the LLM query using the LLM(s) 235. As described herein, the electronic processor 200 may run (or execute), using the LLM(s) 235, a LLM query for the user query using the electronic content (or a portion thereof). In the instance where a user has access, under the user permission(s) 245, to the electronic content that is relevant (e.g., most-relevant) to responding to the user query, the electronic processor 200 may run (or execute the LLM query using the electronic content (e.g., all of the electronic content that is relevant or most-relevant to responding to the user query).

Accordingly, for example, the electronic processor 200 may provide the user query (or corresponding user query embedding(s) thereof), the electronic content (or corresponding vector embedding(s) thereof), or a combination thereof to as input for the LLM(s) 235. The LLM(s) 235 may then provide an output based on the user query (or corresponding user query embedding(s) thereof), the electronic content (or corresponding vector embedding(s) thereof), or a combination thereof. At block 415, the electronic processor 200 may generate a response based on the LLM query. For instance, in some configurations, the electronic processor 200 may generate a response to the user query based on the execution of the LLM query (e.g., execution of an LLM query using the electronic content in its entirety) (e.g., at block 415 of FIG. 4). In some configurations, the electronic processor 200 may perform the process step of block 415 as similarly described herein with respect to the process step of block 320 of FIG. 3.

As another example, FIG. 5 is a flowchart illustrating a method 500 of implementing permission bypass based on a similarity of LLM query embeddings when at least a portion of the electronic content is inaccessible to a user under a user permission according to some configurations. For instance, the method 500 may be implemented when responding to a user query where at least a portion of the electronic content that is relevant (e.g., most-relevant) to the user query is inaccessible to a user under the user permission(s) 245. The method 500 of FIG. 5 may implement permission bypass based on a similarity of LLM query embeddings, as described herein.

As illustrated in FIG. 5, the method 500 may include determining, with the electronic processor 200, that a first portion of the electronic content is accessible to the user under the user permission(s) 245 (e.g., an accessible portion) (at block 505) and that a second portion of the electronic content is inaccessible to the user under the user permission(s) 245 (e.g., an inaccessible portion) (at block 510). Accordingly, in some configurations, when the electronic processor 200 determines an accessibility of the electronic content (e.g., at block 315 of FIG. 3), the electronic processor 200 may determine an inaccessible portion of the electronic content, an accessible portion of the electronic content, or a combination thereof. In some configurations, the inaccessible portion of the electronic content may include the entirety of the electronic content. Alternatively, in some configurations, the accessible portion of the electronic content may include the entirety of the electronic content (e.g., as described herein with respect to the method 400 of FIG. 4).

When the electronic content that is relevant (e.g., most-relevant) to responding to the user query includes an inaccessible portion (e.g., at least a portion of the electronic content is inaccessible to a user under the user permission(s) 245), the electronic processor 200 may determine (or predict) an impact of the user permission(s) 245 on responding to the user query (e.g., how much of an impact the inaccessible portion may have on the response ultimately provided to the user query). For example, the electronic processor 200 may determine whether the exclusion of the inaccessible portion adversely impacts the ultimate response provided to the user (e.g., a degree to which the inaccessible portion impacts a quality or reliability of the response).

For example, as illustrated in FIG. 5, the electronic processor 200 may execute a LLM query (e.g., a first LLM query) using the accessible portion (e.g., the first portion) of the electronic content (at block 515) and execute another LLM query (e.g., a second LLM query) using both the accessible portion (e.g., the first portion) and the inaccessible portion (e.g., the second portion) of the electronic content (at block 520). The electronic processor 200 may execute the first LLM query and the second LLM query (e.g., blocks 515 and 520, respectively) as similarly described herein.

The electronic processor 200 may then generate embeddings for outputs of the LLM queries. For instance, as illustrated in FIG. 5, the electronic processor 200 may generate a LLM query embedding (e.g., a first LLM query embedding) for an output of the first LLM query (at block 525) and another LLM query embedding (e.g., a second LLM query embedding) for an output of the second LLM query (at block 530). In some configurations, the electronic processor 200 may utilize one or more embedding models (e.g., the embedding model(s) 155) to generate LLM query embeddings. For instance, in some configurations, the electronic processor 200 may transmit (or otherwise provide) the outputs from the first LLM query and the second LLM query to the embedding server 110. The embedding server 110 may generate, using the embedding model(s) 155, the corresponding LLM query embeddings (e.g., the first LLM query embedding, the second LLM query embedding, or a combination thereof). The embedding server 110 may then transmit (or otherwise provide) the corresponding LLM query embeddings to the electronic processor 200. Alternatively, or in addition, in some configurations, one or more of the embedding model(s) 155 may be locally stored in the memory 205 of the embedding server 110. In such configurations, the electronic processor 200 may access the embedding model(s) 155 from the memory 205 to generate the corresponding LLM query embeddings.

After generating the LLM query embeddings (e.g., the first LLM query embedding and the second LLM query embedding), the electronic processor 200 may determine a similarity metric between the LLM query embeddings (at block 535). As used herein, the similarity metric may represent a degree of similarity between embeddings or vectors. The term similarity metric may also be referred to herein as a similarity measure or a similarity score. In some configurations, a similarity metric may represent a distance between two embeddings (or vectors). Accordingly, in some configurations, the electronic processor 200 may determine the similarity metric by determining a distance between the first LLM query embedding and the second LLM query embedding. In some configurations, the electronic processor 200 may utilize other or alternative approaches to determining similarity between embeddings (or vectors). In some examples, the electronic processor 200 may determine a cosine angle (as the similarity metric) between the first LLM query embedding and the second LLM query embedding. Alternatively, or in addition, in some examples, the electronic processor 200 may determine a dot product (as the similarity metric) for the first LLM query embedding and the second LLM query embedding.

The electronic processor 200 may then determine whether the similarity metric satisfies a threshold or condition (e.g., a similarity threshold) (at block 540). A similarity metric may satisfy a threshold when the similarity metric indicates that the LLM query embeddings are substantially similar. In some configurations, the similarity threshold or condition may represent an acceptable tolerance or difference range, such that components falling within such a range may be considered similar enough. As one example, where the similarity metric is a distance, the similarity threshold may be a predetermined distance between embeddings. Following this example, when the similarity metric for the first LLM query embedding and the second LLM query embedding is within (or equal to) the predetermined distance (e.g., the similarity threshold), the first LLM query embedding and the second LLM query embedding may be considered similar (or substantially similar).

As illustrated in FIG. 5, when the electronic processor 200 determines that the similarity metric satisfies the threshold (i.e., "Yes" at block 540), the electronic processor 200 may generate the response based on the accessible portion of the electronic content (at block 545). For instance, the electronic processor 200 may generate the response based on an output of the first LLM query such that the response is generated based on the user query (or user query embedding(s) thereof), the accessible portion of the electronic content (or vector embedding(s) thereof), or a combination thereof. Accordingly, in instances where the inaccessible portion does not adversely impact responding to the user query, the response may be generated based on the accessible portion (e.g., without considering the inaccessible portion).

When the electronic processor 200 determines that the similarity metric does not satisfy the threshold (i.e., "No" at block 540), the electronic processor 200 may generate the response based on the accessible portion of the electronic content (at block 550) and generate a notification (at block 555). For instance, the electronic processor 200 may generate the response based on an output of the first LLM query such that the response is generated based on the user query (or user query embedding(s) thereof), the accessible portion of the electronic content (or vector embedding(s) thereof), or a combination thereof. Accordingly, in instances where the inaccessible portion does adversely impact responding to the user query, the response may still be generated based on the accessible portion (e.g., without considering the inaccessible portion), such that, e.g., the user permission(s) 245 are followed. However, in such instances, the electronic processor 200 may generate the notification (e.g., at block 555) such that a user may be notified that a higher quality or more reliable response may be available.

In some configurations, the notification may be provided to a user that provided the user query (e.g., an author of the user query). Alternatively, or in addition, the notification may be provided to another user other than the user that provided the user query. For instance, in some configurations, the notification may be provided to a user that has a different user permission (e.g., a full access permission level, a user permission level that would enable access to the inaccessible portion of the electronic content, etc.). In some configurations, the notification may indicate that the user permission(s) 245 impacted the response (e.g., adversely impacted the response). For instance, the notification may indicate that if the user had permission to access the inaccessible portion, a quality or reliability of the response may improve. Alternatively, or in addition, in some configurations, the notification may indicate instructions or steps for being granted access to the inaccessible portion (e.g., how a user may change their current permission level to another permission level, which may enable access to the inaccessible portion of electronic content). In some configurations, the response may include the notification. For instance, in some configurations, the electronic processor 200 may generate the response (e.g., at block 550) such that the response includes the notification (or content thereof).

As another example, FIG. 6 is a flowchart illustrating a method 600 of implementing permission bypass based on a similarity of LLM query responses when at least a portion of the electronic content is inaccessible to a user under a user permission according to some configurations. For instance, the method 600 may be implemented when responding to a user query where at least a portion of the electronic content that is relevant (e.g., most-relevant) to the user query is inaccessible to a user under the user permission(s) 245. The method 600 of FIG. 6 may implement permission bypass based on a similarity of LLM query responses, as described herein.

As illustrated in FIG. 6, the method 600 may include determining, with the electronic processor 200, that a first portion of the electronic content is accessible to the user under the permission level (at block 605), determining, with the electronic processor 200, that a second portion of the electronic content is inaccessible to the user under the permission level (at block 610), executing, with the electronic processor 200, a first LLM query using the accessible portion (at block 615), and executing, with the electronic processor 200, a second LLM query using the accessible portion and the inaccessible portion (at block 620). In some configurations, the electronic processor 200 may perform the process of blocks 605, 610, 615, or 620 as similarly described herein, such as, e.g., with respect to blocks 505, 510, 515, or 520 of FIG. 5.

The electronic processor 200 may determine a similarity metric between the outputs of the first LLM query and the second LLM query (at block 625). In some configurations, the electronic processor 200 may determine the similarity metric between the outputs of the first LLM query and the second LLM query as similarly described herein with respect to, e.g., block 535 of FIG. 5. For instance, in some configurations, the electronic processor 200 may generate embeddings of the outputs of the first LLM query and the second LLM query (e.g., as similarly described herein with respect to blocks 525 or 530). In some configurations, the electronic processor 200 may determine a similarity metric for the embeddings of the outputs of the first LLM query and the second LLM query and compare the similarity metric to a similarity threshold or condition (e.g., at block 630). Alternatively, or in addition, in some configurations, the electronic processor 200 may compare each individual embedding to a similarity threshold or condition (e.g., compare the embedding of the output for the first LLM query to a threshold or compare the embedding of the output for the second LLM query to a threshold).

As illustrated in FIG. 6, the electronic processor 200 may determine whether the similarity metric satisfies a threshold (at block 630). When the electronic processor 200 determines that the similarity metric satisfies the threshold (i.e., "Yes" at block 630), the electronic processor 200 may generate the response based on the output of the first LLM query (e.g., based on the accessible portion of the electronic content) (at block 635). When the electronic processor 200 determines that the similarity metric does not satisfy the threshold (i.e., "No" at block 630), the electronic processor 200 may generate the response based on the output of the first LLM query (e.g., based on the accessible portion of the electronic content) (at block 640) and generate a notification (at block 645). In some configurations, the electronic processor 200 may perform the process of blocks 630, 635, 640, or 645 as similarly described herein, such as, e.g., with respect to blocks 540, 545, 550, or 555 of FIG. 5.

Alternatively, or in addition, in some configurations, the technology disclosed herein may implement permission bypass in the context of LLMs based on a similarity between vector embeddings and user query embeddings. For instance, in some configurations, the electronic processor 200 may determine vector embeddings representing relevant electronic content. The electronic processor 200 may then determine, from those vector embeddings, a set of vector embeddings representing an accessible portion of electronic content under the user permission(s) 245 (e.g., as a first set of vector embeddings) and determine, from those vector embeddings, another set of vector embeddings representing an inaccessible portion of the electronic content under the user permission(s) 245 (e.g., as a second set of vector embeddings). The electronic processor 200 may determine the vector embeddings (including, e.g., the first set of vector embeddings and the second set of vector embeddings) as described in greater detail herein.

The electronic processor 200 may then determine a similarity between the first set of vector embeddings and the user query embedding (e.g., as a first similarity metric) and another similarity between the second set of vector embeddings and the user query embedding (e.g., as a second similarity metric). The electronic processor 200 may determine a difference between the first similarity metric and the second similarity metric and compare the difference to a threshold or condition (e.g., a similarity threshold). The electronic processor 200 may generate the response to the user query based on the comparison of the difference to the threshold or condition. For instance, when the electronic processor 200 determines that the difference satisfies (e.g., is within or equal to) the threshold or condition, the electronic processor 200 may execute, with the LLM(s) 235, a LLM query using the accessible portion of the electronic files (e.g., the first set of vector embeddings and the user query embedding) and generate a response to the user query based on an output of that LLM query.

As another example, when the electronic processor 200 determines that the difference does not satisfies (e.g., is not within or equal to) the threshold or condition, the electronic processor 200 may execute, with the LLM(s) 235, a LLM query using the accessible portion of the electronic files (e.g., the first set of vector embeddings and the user query embedding) and execute, with the LLM(s) 235, another LLM query using the accessible portion and the inaccessible portion of the electronic files (e.g., the first set of vector embeddings, the second set of vector embeddings, and the user query embedding). The electronic processor 200 may then perform a similarity analysis based on corresponding LLM query embeddings, outputs of executed LLM queries, etc., as described in greater detail herein with respect to, e.g., FIGS. 5-6.

In some configurations, the technology disclosed herein may be implemented within a corporate, business, or organizational setting. For instance, in an example use case involving two entities (e.g., companies or businesses), each entity may manage and control a vector database (e.g., the vector database 115 of FIG. 1). These entities may be engaging in activities that involve sharing information (e.g., electronic content), such as, e.g., a partnership, a merger, an acquisition, or the like.

The technology disclosed herein may be implemented to facilitate the access or exchange of information between two entities, such as, e.g., where each entity may maintain and manage its own vector database (e.g., the vector database 115 of FIG. 1). Such an exchange of information between two entities may occur during, e.g., formation of a partnership, a merger, an acquisition, or the like. In such a situation, the electronic content for a first entity may be represented in a first vector database and electronic content for a second entity may be represented in a second vector database. Following this situation, the electronic content in the first vector database may be inaccessible to the second entity while being accessible to the first entity. Similarly, the electronic content in the second vector database may be inaccessible to the first entity while being accessible to the second entity. Accordingly, in some configurations, depending on the entity perspective, the electronic content of one vector database may be considered an inaccessible portion of electronic content (as described herein) and the electronic content of another vector database may be considered an accessible portion of the electronic content. In such configurations, the technology disclosed herein may implement permission bypass across multiple vector databases 115 as described herein with respect to, e.g., FIGS. 3-6. In some examples, notifications generated regarding an impact of user permission(s) may be provided to users of one or more entities, or a third-party entity.

Alternatively, or in addition, in some configurations, such as configurations involving multiple entities, the technology disclosed herein may facilitate terminology cleaning or handling for user queries. For instance, use of terms specific to an entity (e.g., an organization, business, etc.) or a permission level in a user query may impact responding to a user query. For example, a first entity may use "Term A" to describe an internal process while a second entity may use "Term B" to describe the same internal process.

Figure 7:
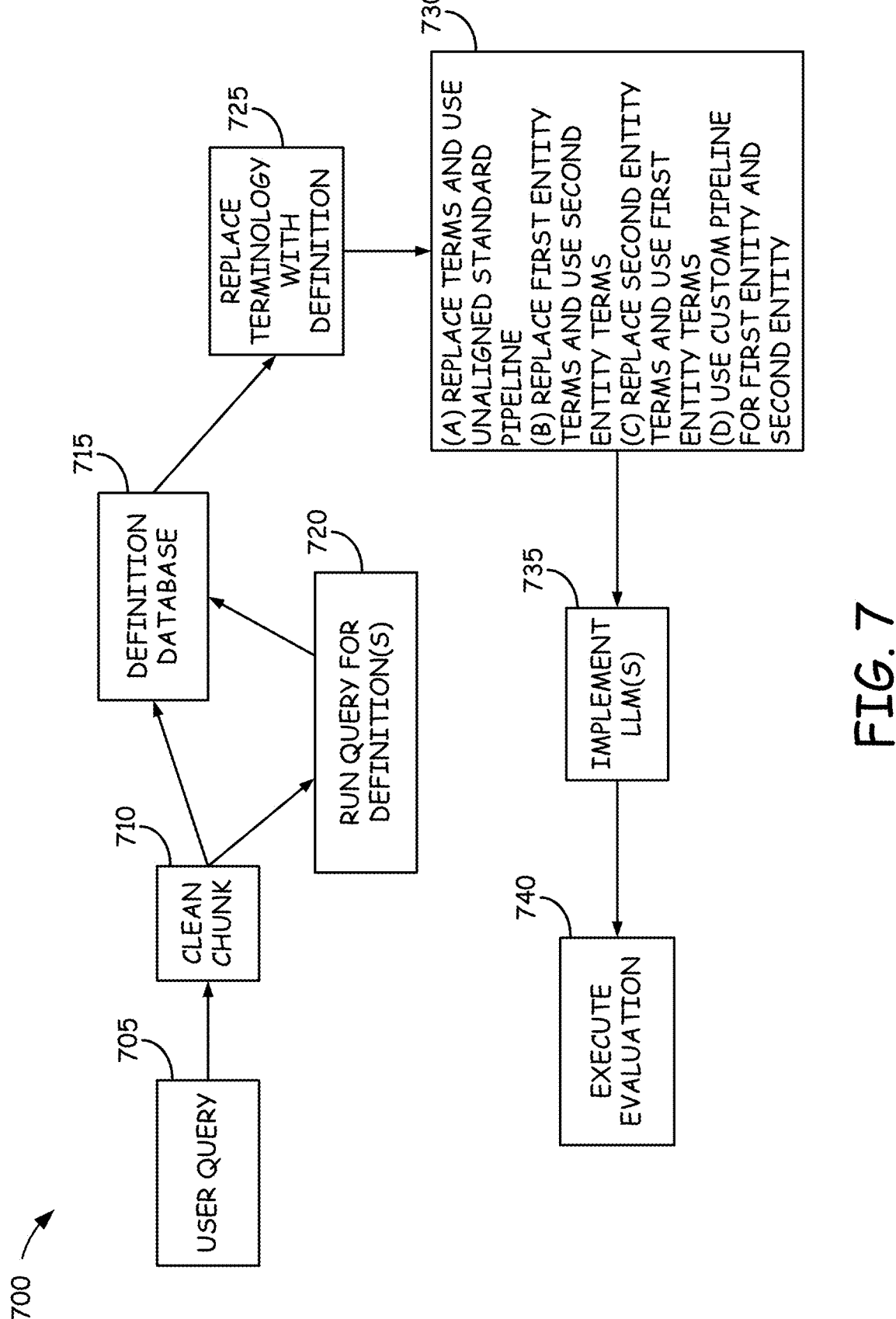
FIG. 7 an example process for handling entity-specific terminology according to some configurations.

FIG. 7 illustrates an example process 700 for handling entity-specific terminology according to some configurations. As illustrated in FIG. 7, at block 705, a user query containing terminology specific to an entity (e.g., an organization, business, etc.) or a permission level may be recited. At block 710, the received user query may be cleaned. After being cleaned, the entity-specific terminology may be provided to a database of different entity-specific terms (at block 715). Alternatively, or in addition, in some instances, the user query may be used to query a respective LLM (e.g., the LLM(s) 235) or databases for a definition of the entity-specific terminology (at block 720). At block 725, the entity-specific terminology may be replaced by a corresponding definition (e.g., from the database of different entity-specific terminology at block 715). In some configurations, replacing the entity-specific terminology may include, e.g., replacing all entity-specific terminology and using unaligned standard pipeline; replacing entity-specific terminology of a first entity and using entity-specific terminology of a second entity; replacing entity-specific terminology of the first entity and using entity-specific terminology of the first entity; or using a pipeline specifically developed for the first entity and the second entity (at block 730). After entity-specific terminology adjustments are made (e.g., at block 730), the LLM(s) 235, an entity LLM instance (e.g., a first entity's LLM, a second entity's LLM, etc.), or a custom LLM tuned for the entities may be implemented (at block 735). At block 740, a difference may be measured and evaluated through embedding distance, querying the LLM, or a combination thereof. In some configurations, this difference may be utilized to generate a user query (e.g., the user query received at block 305 of FIG. 3). For instance, FIG. 7 illustrates an example use case involving two business entities. In the illustrated example, each business entity may manage and control a vector database for that business entity (e.g., the vector database 115 of FIG. 1).

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodied on a non-transitory computer-readable media, such that a processor device can implement the instructions based upon reading the instructions from the computer-readable media. Some examples of the technology can include (or utilize) a control device such as an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the FIGS. or otherwise discussed herein. Unless otherwise specified or limited, representation in the FIGS. of particular operations in particular spatial order can not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular examples of the technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Although the present technology has been described by referring to preferred examples, those skilled in the art will recognize that changes can be made in form and detail without departing from the scope of the discussion.

What is claimed is:

1. A system, the system comprising:
   one or more electronic processors configured to:
   receive, from a user device of a user, a user query pertaining to a topic;
   determine, responsive to a semantic search of a vector database storing a plurality of vector embeddings based on a user query embedding for the user query, a plurality of electronic files related to the topic of the user query;
   determine, based on a permission level of the user, an accessibility of a first portion of the plurality of electronic files, wherein the first portion of the plurality of electronic files are accessible to the user under the permission level;
   determine, for the permission level, a first set of vector embeddings of the plurality of vector embeddings, the first set of vector embeddings representing the first portion of the plurality of electronic files being accessible under the permission level;
   determine a second set of vector embeddings of the plurality of vector embeddings, the second set of vector embeddings representing the plurality of electronic files, wherein the second set of vector embeddings includes the first set of vector embeddings and a third set of vector embeddings representing a second portion of the plurality of electronic files being inaccessible to the user under the permission level;
   determine a first similarity metric between the first set of vector embeddings and the user query embedding;
   determine a second similarity metric between the second set of vector embeddings and the user query embedding;
   determine a difference between the first similarity metric and the second similarity metric; and
   generate, using a large language model ("LLM"), a response to the user query based on the difference and the first portion of the plurality of electronic files.

2. The system of claim 1, wherein the one or more electronic processors are configured to:
   generate, using an embedding model, the user query embedding for the user query; and
   execute, based on the user query embedding, the semantic search of the vector database.

3. The system of claim 1, wherein the one or more electronic processors are configured to determine the first portion of the plurality of electronic files by matching the user query embedding to a set of vector embeddings of the plurality of vector embeddings, wherein the set of vector embeddings represent the first portion of the plurality of electronic files.

4. The system of claim 1, wherein the one or more electronic processors are configured to:
   determine that the first difference is within a first threshold; and execute a first LLM query using the first portion of the plurality of electronic files,
   wherein the response to the user query is generated based on the first LLM query executed using the first portion of the plurality of electronic files.

5. The system of claim 1, wherein the one or more electronic processors are configured to:
   determine that the difference exceeds a first threshold;
   execute a second LLM query using the first portion of the plurality of electronic files;
   execute a third LLM query using the plurality of electronic files;
   generate a second LLM query response embedding representing a first output of the second LLM query response;
   generate a third LLM query response embedding representing a second output of the third LLM query response; and
   determine a third similarity metric between the second LLM query response embedding and the third LLM query response embedding,
   wherein the response to the user query is generated based on the third similarity metric.

6. The system of claim 5, wherein the one or more electronic processors are configured to:
   determine that the third similarity metric satisfies a second threshold; and
   execute, using the LLM, a fourth LLM query using the first portion of the plurality of electronic files;
   wherein the response to the user query is generated based on execution of the fourth LLM query.

7. The system of claim 6, wherein the one or more electronic processors are configured to:
   generate a notification to indicate that the permission level impacted the response.

8. The system of claim 6, wherein the one or more electronic processors are configured to:
   generate a set of instructions for changing the permission level to a different permission level.

9. The system of claim 1, wherein the one or more electronic processors are configured to:
   train, with training data, the LLM model using machine learning, wherein the LLM model is an artificial neural network.

10. The system of claim 1, wherein the LLM model is trained using at least one of self-supervised learning or semi-supervised learning.

11. A method, the method comprising:
   receiving, with one or more electronic processors, a user query from a user device of a user, the user query being related to a topic;
   executing, with the one or more electronic processors, a search of a vector database based on the user query;
   determining, with the one or more electronic processors, based on the search, electronic content related to the topic of the user query;
   determining, with the one or more electronic processors, based on a permission level, an accessibility of the electronic content to the user, wherein a first portion of the electronic content is accessible to the user under the permission level and a second portion of the electronic content is inaccessible to the user under the permission level;
   executing, with the one or more electronic processors, using a large language model "(LLM")", a first LLM query using the first portion of the electronic content;

executing, with the one or more electronic processors, using the LLM, a second LLM query using the first portion and the second portion of the electronic content; and generating, with the one or more electronic processors, a first response to the user query based on a similarity of a first output of the first LLM query and a second output of the second LLM query.

12. The method of claim 11, further comprising:

determining that the first portion of the electronic content is accessible to the user under the permission level; and determining that the second portion of the electronic content is inaccessible to the user under the permission level.

13. The method of claim 11, further comprising:

determining that the first portion of the electronic content is accessible to the user under the permission level;

determining that the second portion of the electronic content is inaccessible to the user under the permission level;

generating, using an embedding model, a first LLM query embedding for a first output of the first LLM query;

generating, using the embedding model, a second LLM query embedding for a second output of the second LLM query;

determining a similarity metric between the first LLM query embedding and the second LLM query embedding; and generating, based on the similarity metric, a fourth response to the user query.

14. The method of claim 11, further comprising:

generating, using an embedding model, a user query embedding for the user query; and identifying a plurality of vector embeddings from the vector database, the plurality of vector embeddings being within a similarity threshold of the user query embedding, wherein the plurality of vector embeddings represent the electronic content.

15. A non-transitory, computer-readable medium storing instructions that, when executed by an electronic processor, perform a set of functions, the set of functions comprising:

receiving, from a user device of a user, a user query;

generating, using an embedding model, a user query embedding for the user query;

executing a semantic search of a vector database to identify, based on the user query embedding, a plurality of vector embeddings from the vector database;

determining, based on the plurality of vector embeddings, a plurality of electronic files related to the user query;

determining, based on a permission level, an accessibility of the plurality of electronic files for the user;

determining, for the permission level, a first set of vector embeddings of the plurality of vector embeddings, the first set of vector embeddings representing a first portion of the plurality of electronic files being accessible under the permission level;

determining a second set of vector embeddings of the plurality of vector embeddings, the second set of vector embeddings representing the plurality of electronic files, wherein the second set of vector embeddings includes the first set of vector embeddings and a third set of vector embeddings representing a second portion of the plurality of electronic files being inaccessible to the user under the permission level;

determine a difference between a first similarity metric and a second similarity metric, wherein the first similarity metric is between the first set of vector embeddings and the user query embedding and the second similarity metric is between the second set of vector embeddings and the user query embedding; and generate, using a large language model ("LLM"), a response to the user query based on the difference.

16. The computer-readable medium of claim 15, wherein the set of functions further comprises:

determining an impact of the permission level on responding to the user query, wherein generating the response to the user query includes generating the response to the user query based on the impact.

17. The computer-readable medium of claim 16, wherein generating the response to the user query based on the impact includes at least one of:

generating the response to the user query based on the first portion of the electronic files; or generating a notification indicating the impact of the permission level on the response.

* * * * *